Patented Oct. 26, 1948

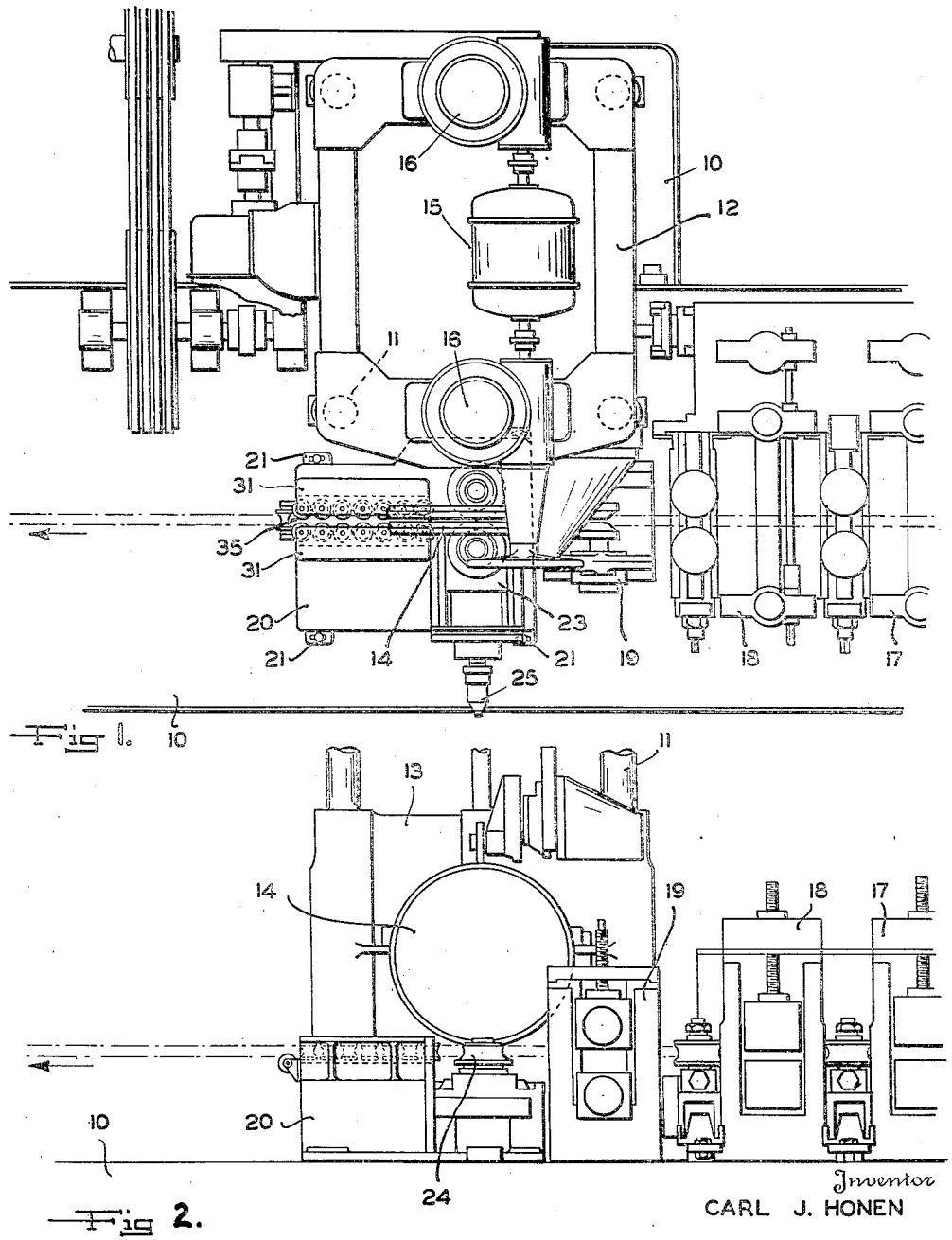

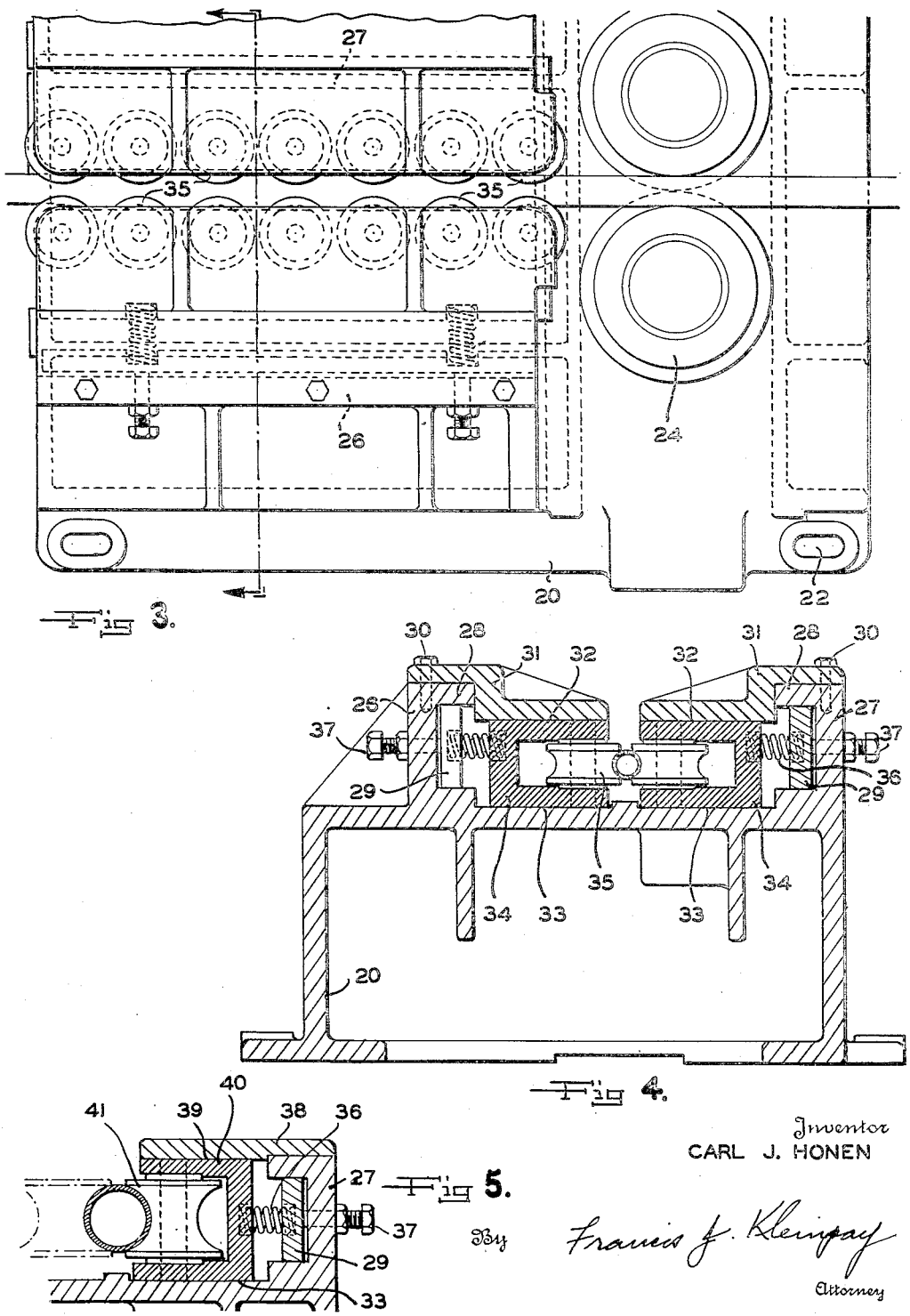

2,452,303

UNITED STATES PATENT OFFICE 2,452,303

MULTIPLE WELDING PRESSURE ROLL ASSEMBLY FOR ELECTRIC WELD TUBE MILLS

Carl J. Honen, Youngstown, Ohio, assignor to The McKay Machine Company, Youngstown, Ohio, a corporation of Ohio Application December 18, 1947, Serial No. 792,471

8 Claims. (Cl. 219—6)

1

This invention relates to apparatus for electrically welding metallic tubing along a longitudinal seam in the manufacture thereof and it is well known in such apparatus to pass a welding current across the pressure-abutted edges of the stock to effect resistance heating of the edges to welding temperature after which the stock may be passed through an additional pressure roll pass to effect final forging and welding of the tube. While this general method is quite satisfactory in welding the more common grades of steel stock considerable difficulty has heretofore been encountered in the continuous production of tubes by the electric resistance butt-welding method where the metallic stock is of a character which is more difficult to weld by the electric resistance welding process. In the case of the stainless steels, for example, containing a high proportion of nickel a higher welding temperature is required and the temperature range of the optimum welding plasticity of the metal is comparatively small so that in existing welding apparatus employing the subject method of producing tubes it is very difficult to impart sufficient heat to effect a consistently good weld in the stock while yet avoiding overheating of the metal which results in excessive upset or possibly in spilling through of fluid metal. Moreover, in the case of stainless steels and other alloys the rate of heat dissipation from the welding cleft is quite low so that if the cleft is slightly overheated by the welding current or if the radially inward confining pressure is removed from a tube at an early stage the initial weld may reopen thus resulting in a defective tube product.

I have found that tubing of stainless steel and other alloys normally considered difficult to weld by electric resistance welding process may be more expeditiously produced if in the continuous butt-welding machine provision is made to firmly but yieldingly apply radially inward pressure to the tube at a multiplicity of closely spaced points immediately beyond the welding throat of the machine. With the use of such apparatus it is possible to reduce somewhat the strength of welding current employed to thus avoid overheating of the stock while yet insuring a consistent and uninterrupted weld of good quality in the final product. It is accordingly the primary object of the invention to provide an improved multiple pressure roll assembly for a continuous butt-weld electric tube mill which is operative to effect the advantages as regards the operating characteristics of the mill and the quality of the product thereof as herein discussed. A further object of the invention is the provision of an improved multiple pressure roll assembly for an electric weld tube mill which is in the form of a unitary device, thus being readily available as an alternate attachment for an electric weld mill of conventional design whereby any such conventional mill may be readily improved and made suitable for producing a wider variety of alloy tubes.

Yet another object of the invention is the provision of a multiple pressure roll attachment for an electric resistance weld tube mill in which substantially simplified and improved arrangements are incorporated for accurately varying the compressive force exerted by the pressure rolls on the tube being produced as the tube issues from the welding throat of the mill, i. e. as the tube issues from the electrode pass. Because of this improvement the setting up of the mill to weld any particular diameter tube is simplified, the outer diameter of the tube being produced may be vary accurately sized, and a continuous weld of good quality may be effected without excessive upset of the stock. The above and other objects and advantages of the invention will become apparent upon consideration of the following detailed specification and the accompanying drawing wherein there is disclosed a certain preferred embodiment of the invention.

In the drawing:

Figure 1 is a fragmentary plan view of an electric butt-weld tube mill embodying the improvement of my invention;

Figure 2 is a side view of the apparatus of Figure 1;

Figure 3 is a plan view, on an enlarged scale, of a portion of the attachment of my invention;

Figure 4 is a transverse vertical section through the attachment of my invention; and Figure 5 is a fragmentary detailed view, on an enlarged scale, of a slightly modified form of multiple pressure roll attachment for use in producing tubes of larger diameter.

Referring first to Figures 1 and 2, the reference numeral 10 designates the main frame of the welding machine which, in accordance with usual practice, mounts a number of upstanding columns 11 capped by a frame 12. Slideably mounted on the columns 11 is a carrier 13 for rotatably mounting a welding transformer, not shown, and it will be understood by those familiar with the art that such rotary transformer assembly mounts a pair of wheel-type electrodes 14 which are arranged to be lowered onto the work by downward movement of the carrier 13. Such carrier is arranged to be moved up and down by a motor 15 acting through worm gears 16. In accordance with usual practice the formed stock is fed to the welding machine by a cold roll forming machine including the stands 17 and 18 which are operative to finally form the initial strip stock into an open-cleft tube. Immediately ahead of the welding electrodes 14 of the assembly is a roll stand 19 which is operative to maintain the formed tube in a guided position by means of a seam guide roll engaging the open seam of the tube as it enters the welding throat of the assembly immediately below the electrodes 14, all in accordance with usual practice.

For the purpose of effecting a proper welding pressure in the stock in the welding throat of the assembly and for maintaining a more or less continuous holding pressure on the stock for a substantial interval after the stock leaves the welding throat I provide a roll assembly which is carried on a unitary base 20. This base 20 may be readily positioned on or removed from the main base 10 of the tube mill and when it is in position on the base it may be detachably and adjustably held thereon by the cap screws 21 which pass through elongated apertures 22 at each of the four corners of the base 20. Slideably mounted in suitable transverse ways formed in one end of the frame 20 are the carriers 23 for the pressure rolls 24 which are mounted at the welding throat of the machine. Since the pressure rolls 24 and their mountings are more or less of conventional construction their mountings are not shown in detail although it will be understood that such mountings are normally provided with screw-threaded means (shown herein schematically at 25, Figure 1) whereby the two opposing pressure rolls 24 may be moved either simultaneously or individually toward and away from each other for the purpose of exerting proper welding pressure on the stock and of centering the stock with respect to the welding electrodes 14.

Referring now more particularly to Figures 3 and 4, it will be observed that extending upwardly from the upper wall of the base 20 is a pair of spaced parallel side rails 26 and 27 which may be formed integral with the structure of the base 20 and capping each of the rails 26 and 27 is an inwardly directed integral flange 28. There is thus provided immediately inward of the rails 26 and 27 longitudinally extending pockets and there is received in each of these pockets a bar 29 each of which may have limited transverse sliding movement toward and away from the stock pass line through the machine. Overlying the flanges 28 and rigidly but detachably secured thereto as by means of the cap screws 30 are the offset plates 31 each of which has a lower surface to overlie the upper surface of the contiguous flange 28 and an offset inwardly spaced surface 32 which is opposite a flat surface 33 formed on the upper wall of the base 20. Slideably mounted for transverse movement between each of the pairs of surfaces 32, 33 is a U-shaped bar 34 between the legs of which is journaled a series of longitudinally spaced pressure rolls 35. The rolls 35 are of small diameter and by referring to Figure 3 it will be noted that these rolls are spaced as closely together as is possible and that the respective rolls of one of the bars 34 are mounted directly opposite the respective rolls of other of the bars 34 so that there is thus, in effect, provided a series of closely spaced confining passes for the tubular stock as it issues from the welding throat of the machine. Rolls 35 are contoured accurately to the outer diameter of the tube being produced and it will be understood that during operation of the mill the roll sets may be readily changed to reset the mill for making a tube of different diameter.

In order that the rolls 35 will exert an adjustable but yieldable compressive force on the tube as it leaves the welding throat and to thereby continuously maintain a holding pressure across the cleft of the tube which has been welded in the throat (or which is welded between the rolls 35 as the case may be) I interpose between each of the bars 34 and its associated or contiguous bar 29 a plurality of transversely extending but longitudinally spaced coil springs 36 which, as shown more clearly in Figure 4, are seated in aligned recesses formed in the bars 29 and 34. Springs 36 are quite stiff and are calculated to provide, collectively, an expansive force which is sufficient to maintain an adequate welding and/or holding pressure across the cleft of the tube being produced to properly weld or hold the weld in the tube without throwing out an excessive burr along the tube. To vary the forces which are exerted by the springs 36 the bars 29 may be moved laterally inwardly and outwardly by the cap screws 37 which have screw threaded engagement in apertures formed in rails 26 and 27. In this manner the clamping forces exerted by the rolls 35 on the tube passing therebetween may be readily increased or decreased as desired.

In the embodiment of the invention shown in Figure 5 wherein the multiple pressure roll assembly is set up for acting on tubing of larger diameter the offset cap member 31 of Figure 4 are replaced by flatter cap members 38 each having a lower bearing surface 39. However, the flatter nature of the cap members 38 provides a greater interval between the bearing surfaces 33 and 39 than exists between the bearing surfaces 33 and 32 of Figure 4 so that a U-shaped roll mounting bar 40 of greater height may be accommodated. The bars 40 journal a series of pressure rolls 41 in the manner identical to the mounting of the rolls 35 in the first decribed embodiment. In the assembly of Figure 5 the forces exerted on the tubing by the rolls 41 may again be readily varied and precisely controlled by manipulation of the cap screws 37.

It should be readily apparent that the low flat nature of the multiple pressure roll assembly enables the entering in of this assembly to be positioned under the welding electrode 14 of the welding assembly so that as the tubing issues from the welding throat of the machine it enters almost directly into the closely spaced confining passes provided by the pressure rolls 35 or 41. Thus, there is no opportunity for the initially welded cleft of the tubing to open or separate as it leaves the welding throat of the machine and, further, since the pressure rolls 35 are closely spaced the compressive force applied by the rolls 35 throughout the length of the multiple roll assembly remains substantially continuous. This is of great advantage in welding alloys, the stainless steels, for example, in which there is a low rate of heat dissipation from the zone of weld. Further, this apparatus enables consistently good welds to be effected while limiting the heating of the stock edges to the lower portion of the range of welding plasticity of the metal or alloy thereby decreasing the amount of metal thrown up in the burrs of the product. Also, the apparatus enables the welder to be satisfactorily operated with less critical heat adjustment as will be understood.

From the above description it will be obvious that the entire welding pressure roll assembly including the rolls 24 and the rolls 35 or 41 may be removed from the welding machine as a unit upon withdrawal of the cap screws 21. This is advantageous in some installations as it permits the quick changeover of the machine and the replacement of the improvement of the present invention with more conventional apparatus if desired. In the alternative, the apparatus of the invention may be readily changed over for operating from tubing of different diameter simply by removing the cover plates 31 and replacing the bars 34 with other bars carrying pressure rolls contoured complementary to the diameter of the tube to be next produced. It will be understood, of course, that in accordance with usual practice the pressure rolls 24 will be made readily removable over the top of the stud shafts on which they are mounted.

The above specifically described embodiments of the invention should be considered as illustrative only as obviously many changes may be made therein without departing from the spirit or scope of the invention. Reference should therefore be had to the appended claims in determining the scope of the invention.

What I claim is:

1. In a continuous butt-weld tube mill having a welding station comprising a base and a pair of rotary electrodes for engaging the stock on opposite sides of the cleft to be welded the combination of a multiple pressure roll assembly comprising a base adapted to be detachably secured to said first mentioned base below said rotary electrodes, a pair of pressure rolls journaled on said second mentioned base for rotation about spaced axes positioned on opposite sides of the cleft being welded, said pair of rolls engaging the tube in a transverse plane closely adjacent the points of contact of said electrodes with said tube, a pair of spaced parallel outwardly extending ways on said second mentioned base, an elongated bar mounting a plurality of closely spaced pressure rolls slideably received in each of said ways for lateral movement toward and away from each other, and means for adjustably and yieldably urging said bars toward each other whereby the rolls carried thereby will apply compressive pressure to said tube on opposite sides of the welded cleft thereof.

2. In a continuous butt-weld tube mill having a base and a welding throat comprising of a pair of pressure rolls journaled for rotation on spaced axes positioned on opposite sides of the tube cleft being welded, a sub-base detachably secured to said first mentioned base and having means thereon rotatably mounting said pair of pressure rolls, a pair of spaced parallel outwardly extending ways on said sub-base, an elongated bar mounting a plurality of closely spaced pressure rolls slideably received in each of said ways for lateral movement toward and away from each other, and means for adjustably and yieldably urging said bars toward each other whereby the rolls carried thereby will apply compressive pressure to the welded tube on opposite sides of the welded cleft thereof.

3. In a continuous butt-weld tube mill having a welding throat the combination of a multiple pressure roll attachment and means to position said attachment closely adjacent said welding throat; said attachment comprising a base having a pair of transversely spaced but longitudinally extending ways therein, an elongated bar mounting a plurality of closely spaced pressure rolls slideably received in each of said ways for lateral movement toward and away from each other, and means for adjustably and yieldably urging said bars toward each other whereby the rolls carried thereby will apply compressive pressure to the welded tube on opposite sides of the welded cleft thereof.

4. In a continuous butt-weld tube mill having a welding throat the combination of a multiple pressure roll device for acting on the tube as it issues from said welding throat and means to position said device closely adjacent said welding throat; said device comprising a pair of spaced parallel bars each rotatably mounting a plurality of tube-engaging pressure rolls, and yielding means to urge said bars toward each other whereby the rolls carried thereby will apply compressive pressure to the welded tube on opposite sides of the welded cleft thereof.

5. A multiple pressure roll assembly for a continuous butt-weld tube mill comprising in combination a base, a pair of laterally spaced but longitudinally extending bearing surfaces on said base, rails extending upwardly from said base along the outer edges of said bearing surfaces and each being recessed on its inner side to receive a longitudinally extending bar, a cover plate detachably secured to the upper end of each rail and having a lower bearing surface opposing one of the first mentioned bearing surfaces, a U-shaped bar disposed intermediate each pair of upper and lower bearing surfaces and slideably mounted sidewise between said bearing surfaces for movement toward and away from each other, a plurality of tube-engaging pressure rolls rotatably mounted in the longitudinal recess in each U shaped bar, means to move said first mentioned bars toward and away from each other, yielding means interposed between said first mentioned bars and said U-shaped bars.

6. In an electric resistance welding machine for producing continuous butt-weld tubing and having a pair of rotary electrodes as well as a pair of pressure rolls positioned to engage the tubing substantially in transverse alignment with the points of engagement of said electrodes with said tubing the combination of a multiple pressure roll assembly having its entering end positioned closely adjacent the welding pass provided by said electrodes and said pair of pressure rolls, said assembly comprising a plurality of closely spaced small-diametered tube-engaging rolls positioned on opposite sides of the tubing as it issues from said welding pass, and adjustable means for biasing said small-diametered rolls into pressure engagement with said tubing.

7. Apparatus according to claim 6 further including a common support for rotatably mounting the small-diametered rolls on either side of said tubing, said means to bias comprising yieldable means to urge said common supports toward each other.

8. Apparatus according to claim 6 further characterized in that the small-diametered rolls on either side of said tubing are rotatably carried by a common supporting member, and detachable means for mounting said supporting members whereby the groups of pressure rolls may be readily interchanged for operating on stock of different diameter.

CARL J. HONEN.

REFERENCES CITED

The following references are of record in the file of this patent:

UNITED STATES PATENTS

| Number | Name | Date |
| --- | --- | --- |
| 1,247,501 | Butcher | Nov. 20, 1917 |
| 2,027,607 | McGuire | Jan. 14, 1936 |